United States Patent [19]

Schlesinger et al.

[11] 4,332,164
[45] Jun. 1, 1982

[54] BTU METER

[76] Inventors: Robert J. Schlesinger, 18645 W. Hatteras, Tarzana, Calif. 91356; Patrick J. Keegan, 8711 Haskell St., Sepulveda, Calif. 91343

[21] Appl. No.: 89,528

[22] Filed: Oct. 29, 1979

[51] Int. Cl.³ .......................................... G01K 17/16
[52] U.S. Cl. ................................................. 73/193 R
[58] Field of Search ................................... 73/193 R

[56] References Cited

U.S. PATENT DOCUMENTS

| | | | |
|---|---|---|---|
| 3,617,713 | 11/1971 | Karlsson | 73/193 R |
| 3,639,737 | 2/1972 | McKee | 73/193 R |
| 3,971,252 | 7/1976 | Onoda | 73/193 R |
| 4,224,825 | 9/1980 | Feller | 73/193 R |

FOREIGN PATENT DOCUMENTS 2318410  3/1977  France ............................... 73/193 R Primary Examiner—Kyle L. Howell
Assistant Examiner—Denis E. Corr
Attorney, Agent, or Firm—Ralf H. Siegemund

[57] ABSTRACT

The temperatures at the inlet and the outlet of a solar energy collector being flown through by water are detected and compared with a ramp signal to provide a pulse train in which the number of pulses represents the temperature differential. The ramp signal is produced at a repetition rate representing the water flow rate so that the tallied pulses represent the BTU's as absorbed by the collector.

5 Claims, 3 Drawing Figures

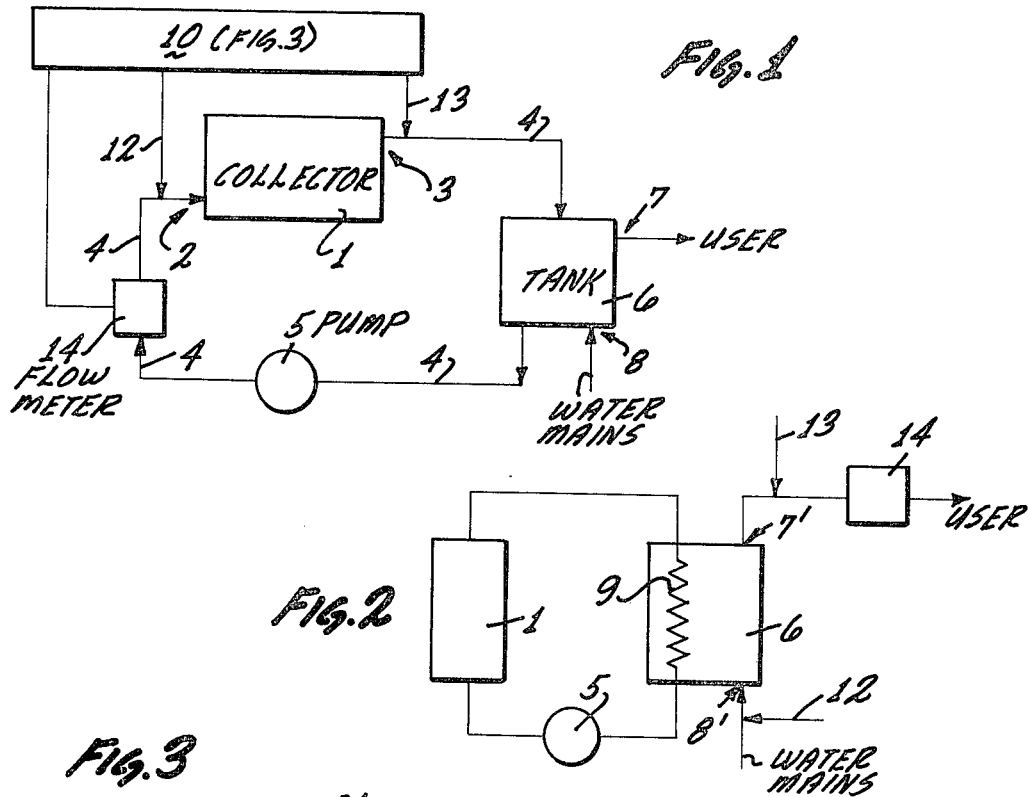
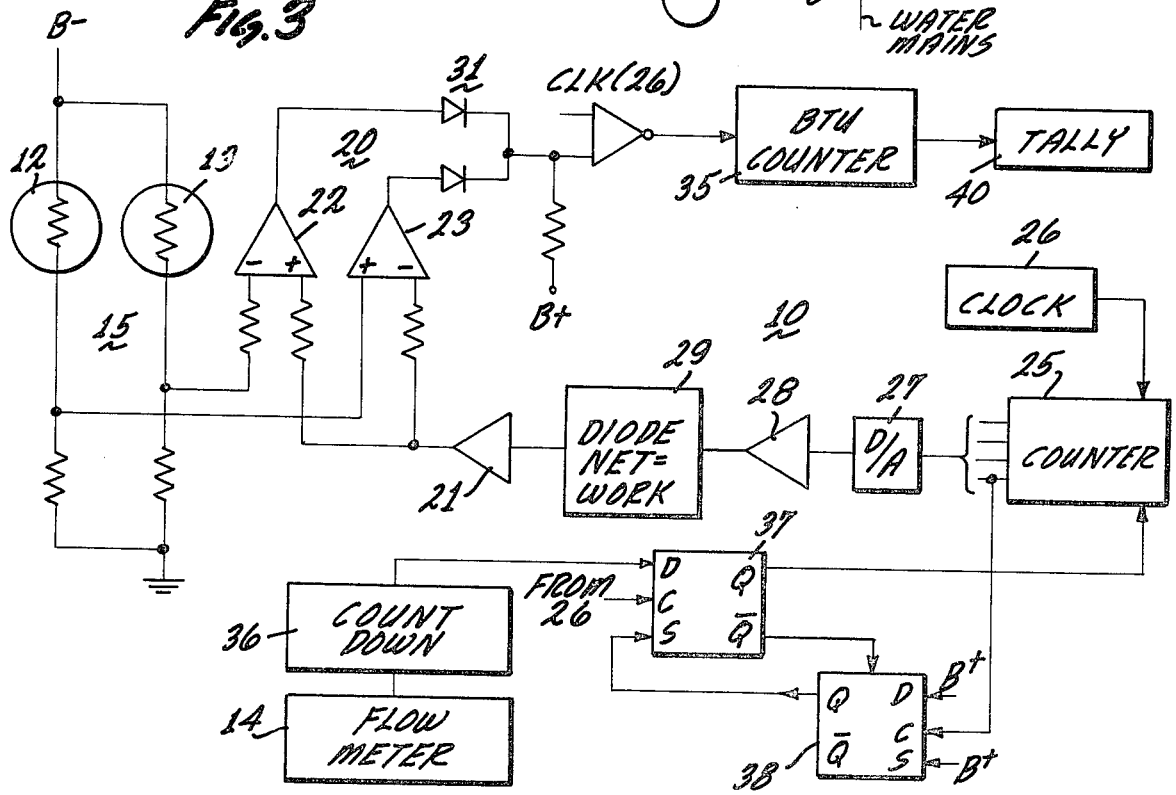

BTU METER

BACKGROUND OF THE INVENTION

The present invention relates to a BTU meter (Watt or Joule) for thermal energy collecting and absorbing devices, particularly for solar radiation collectors.

Utilization of solar energy has become increasingly of interest due to the problems raised by fossil fuel; the problems are, of course, diminishing supply and pollution. Basically, two approaches have been followed for collecting solar energy. In one of these approaches, solar radiation is collected over a large area and in the order of megawatts to be stored and fed to a power plant, hopefully to satisfy the power requirements of an entire city. The other approach operates on a much smaller scale; each solar collecting unit collects and provides as much energy for use in the home as possible and as can be collected, for example, on the roof of the house. In order to induce consumers, for example homeowners, to use such a device, various incentives have been introduced such as tax relief or a lease arrangement. The lease fee is for example based on the consumption of energy and power but at a lower rate than it would cost the homeowner to electrically heat his house or to use gas or oil heat. There is, therefore, a need for an efficient BTU meter for such a solar heating system in order to determine the extent of the actual use thereof.

DESCRIPTION OF THE INVENTION

It is the object of the present invention to provide a new and improved BTU meter for thermal energy collectors and more particularly it is an object of the present invention to measure the BTU gained in a solar energy collector which is flown through by a fluid and whose enthalpy is increased as the result of absorbing solar radiation, directly or indirectly.

In accordance with the preferred embodiment of the present invention, it is suggested to measure separately the temperature of the fluid at the inlet and at the outlet (charge and discharge) of devices such as a thermal energy collector and to measure also the rate of flow of the fluid. The measuring result of the rate of flow is converted into pulses whose spacing is inversely proportional to a unit volume flow therethrough. A ramp voltage is generated for each such pulse and referenced against the temperature measurements. Clock pulses of constant frequency are counted during a period in which the reference ramp has values between the temperature measuring signals, and these pulses are tallied, i.e. added to a counter which culmulatively meters the pulses. Since the rate of pulse production is carried out in proportion to volume, which each pulse represents a temperature difference increment, each counted pulse can be assigned a particular BTU unit value so that the sum total as tallied by the counter represents BTU consumption beginning at the time the counter is started on.

The thermal energy collector involved is preferably the collector which is directly exposed to radiation and is flown through by water or other fluid. Alternatively, the energy collector may be one which indirectly collects solar energy in that a tank whose inlet and outlet temperatures are measured receives its energy through heat exchange, and the primary input of that heat exchange is a solar energy collector. In this case, only the BTU content of water withdrawn from the tank is measured; the measuring principle remains the same.

The principle of the invention can be employed to measure the increase in thermal energy by and in a flowing medium, irrespective of the source, and the invention can also be practiced for measuring the dissipation of thermal energy by a flowing medium. Therefore, it is a further object of the present invention to provide a new and improved BTU meter for thermal energy collectors, absorbers, heat exchanges, dissipators, or similar type devices, to measure gain or loss in thermal energy by a fluid passing through the device.

DESCRIPTION OF THE DRAWING

While the specification concludes with claims, particularly pointing out and distinctly claiming the subject matter which is regarded as the invention, it is believed that the invention, the objects and features of the invention, and further objects, features, and advantages thereof will be better understood from the following description taken in connection with the accompanying drawings in which:

FIG. 1 is a simplified systems diagram explaining the background of the invention and an example for a unit to which the invention pertains, the system showing direct solar heating of a consumer's hot water supply;

FIG. 2 is a modification of the system shown in FIG. 1 showing indirect solar heating of the hot water system of a consumer; and FIG. 3 is a block diagram of a BTU meter in accordance with the preferred embodiment of the present invention and as applied to the system of either FIG. 1 or FIG. 2.

Proceeding to the detailed description of the drawing, FIG. 1 illustrates a solar energy collector 1 being mounted, for example, on the roof of a building or the like. Relatively cold water enters the collector at inlet 2 and leaves the collector at outlet 3. Collector inlet and outlet each constitute parts of a water circulation system which includes further tubing 4, a pump 5, and a water storage device 6. Hot water is extracted from the storage tank 6, at the outlet 7 thereof, while the water mains are connected to the tank inlet 8.

The pump 5 is controlled by a control circuit (not shown) of the type disclosed in my U.S. Pat. No. 4,109,639, the operation being dependent upon the temperature differential between collector and tank temperatures.

For purposes of measuring the amount of power absorbed by the system, one needs to know the difference in water temperature at inlet 2 and outlet 3. Accordingly, two thermal feelers 12 and 13 are respectively provided adjacent to the collector inlet and outlet, on the inside thereof, to measure the temperature of the water as it flows into the collector and as it flows out again respectively. A flow meter 14 being suitably disposed into pipe 4 measures the amount of water fed to the collector. One may alternatively place the flow meter downstream from the collector discharge.

These three elements, 12, 13, and 14, provide the inputs for the BTU meter 10 explained in detail with reference to FIG. 3. It should be noted, however, that the thermal feeler 13 could be shared with a control circuit of my patent as far as providing an input representing the collector temperature is concerned.

Before proceeding to the description of the system, I turn briefly to FIG. 2 showing a solar radiation collector circuit which, however, is a closed fluid circuit for heating a tank 6' by means of a heat exchanger 9. The water mains are connected here onto a inlet 8' of tank 6', and the user water is extracted from the tank at outlet 7'. Thus, the tank is an energy collector in the sense that it collects thermal energy through a heat exchange process and not directly by absorbing thermal radiation. Solar radiation is still the primary energy and power input providing power for the primary heat exchange circuit which in this particular instance is a closed loop circuit. The two thermal feelers 12 and 13 are shown to be connected to the tank inlet and outlet and the flow meter is for example disposed downstream from the outlet. In this case one does not measure directly the BTU content being collected from the sun but one measures the BTU content added to the tank and extracted therefrom. Thus, insulation losses of collected energy and losses during transport to the tank or the losses through the insulation of the tank are suppressed in this case. Of course the thermal feelers and flow meter can be positioned in the direct system of FIG. 1 as shown in FIG. 2 and vice versa.

Proceeding now to the description of the system as shown in FIG. 3, the two thermo feelers 12 and 13 are shown here as components in a bridge circuit 15 which includes additionally two resistors 16 and 17 and is connected between a suitable voltage source B⁻ and ground.

The thermal feelers may be of any suitable varieties such as thermistors, RTD's, etc., changing their resistance with temperature over a wide range of temperatures as they occur in such a system, the range being in actuality given by the freezing and boiling points of water. However, in an indirect system as shown in FIG. 2, a different liquid having greater absorbtive qualities may be used so that the range is accordingly different. A smaller range is also sufficient if one uses a system of the type shown in FIG. 2 and connects the feelers to the user's water system.

The two bridge terminals are connected separately to a temperature differential detecting Circuit 20 including two differential amplifiers, 22 and 23, each of which receives a reference voltage from an amplifier 21. Together, these amplifiers constitute a circuit which compares the temperature differential across the collector, i.e., the increase in temperature of the radiation absorbing fluid, with a reference voltage which, as will be explained next, is a ramp signal whose sweep range covers the entire thermal operating range. The outputs of amplifiers 22 and 23 are actually logic signals feeding a common "or" gate 31.

The reference voltage is generated as follows. A counter 25 counts pulses from a clock 26 having, for example, a frequency of 350 cps. It should be noted that for purposes of this invention no criticality exists as to the accuracy of that frequency so that a very simple, free running blocking oscillator suffices.

The counter may, for example, count from zero to $2^8-1$, thus having 8 stages which are outputted in parallel to a digital-to-analog converter 27. This converter therefore, produces a staircase type ramp signal which increases in steps, the steps being determined by the clock 26. As will be explained more fully below, this ramp signal represents temperature reference values whereby each step may represent 1° F. Thus, a counter range of 255 suffices and rather conveniently matches the temperature range between freezing and boiling water.

The converter 27 feeds a first amplifier 28 whose output is connected to a diode circuit 29. The diode circuit 29 is constructed to duplicate the, usually, nonlinear resistance or voltage versus temperature characteristics of the thermal feeler elements 12 and 13. This non-linear signal is again amplified in 21, to raise the ramp signal level to one that is suitable in the comparator circuit 20. It should be noted that the function of diode network 29 could be incorporated in the digital-to-analog converter 27 providing ab initio a non-linear sweep signal that matches the temperature characteristics of the particular thermo-feelers employed.

It can thus be seen that the counter 25, in cooperation with components 27, 28, 29 and 21, produces a non-linear ramp signal, beginning a sweep at a negative voltage level for a count state 0 and rising towards 0 volts for a count state of 255. The counter 25 is constructed to reset and recycle with the next clock, after count state 255 has been reached, and stops. The counter will not continue to produce ramps on a regular cyclic basis because it will be disabled after a cycle and will start to produce another ramp sweep on command only.

During a signal ramp cycle, the following three different situations are encountered or one can say that three different ranges are being passed through by the ramp signal. These ranges are defined by the different temperatures of the sensors 12 and 13 if the temperatures are in fact different; if not, only two ranges are defined and established.

The first range is defined by a ramp signal level representing temperatures below the lowest of the two temperature values being usually the one sensed by the inlet temperature detector 12.

The second range is defined by ramp levels representing temperatures higher than the one sensed by 12 but lower than the one sensed by the outlet sensor 13.

The third ramp signal range is defined by signal levels representing temperatures higher than the highest one sensed in this two sensor system.

Looking at the two differential amplifiers, it can be seen that the reference and signal inputs are applied to them differently. This means that for similar inputs from the two thermal sensors the outputs of the two amplifiers 22 and 23 differ—one is high and the other one is low, depending on the relative value of the reference. Thus, in the first range in which the ramp signal levels remains below both sensor outputs, the output of differential amplifier 22 is low and the output of differential amplifier 23 is high. In the second range of temperatures as defined above, the signal from sensor 13 is above, and the signal from sensor 12 is below the reference, but due to the inverted connections at the inputs, both amplifiers 22 and 23 product similar outputs which in this particular case means that both are low. In the third range, the output of amplifier 22 is high and the output of amplifier 23 is low.

A fourth case is possible if the temperature of the fluid at the output is lower than the temperature at the input. This is, of course, not a regular case, but it may well occur that one actually dissipates thermal energy. For example, a situation may occur that on cold nights radiation emanates from the collector and the radiation balance is negative. In severe cases the danger exists that the water in the collector freezes. The system, as controlled in accordance with my co-pending patent, may be controlled so that warm water is slowly circulated out of the tank and in and through the collector to prevent it from freezing. Within the logic levels presently considered this is represented by high outputs of both amplifers. The output temperature of the collector, is in fact lower than the input temperature. My patent mentioned above describes specifically a flow control for such a situation. (see also U.S. Pat. No. 3,986,489).

It can thus be seen that the "or" gate 31 has a low output only during the particular period of time in which the ramp signal levels sweep from a level equal to a signal representing a lower inlet temperature of the collector for a level representing a higher outlet temperature. The length of that period, in which the output of the "or" logic gate 31 is low, represents the temperature difference i.e. the increase in the temperature of the water in and produced by the collector. This period being directly proportional to the temperature differential to be increased, is now metered in the following fashion.

The output of "or" gate 31 is used as a gating signal for a "nor" gate 32 receiving also the clock pulses from source 26. Therefore, these pulses become thermal units, each pulse representing an incremental temperature difference which is per se totally arbitrary and a matter of calibration, infra. However, it will be recalled that the clock pulses were used to generate the ramp signal as a temperature reference signal in steps of 1° F. per pulse. The metering process presently described uses the same 1° steps. This however, is merely convenient and not essential. One could use different clocks for ramp generation and gating at 32. However, the resolution of the measuring system as a whole depends on the incremental value used for the generation of the ramp as well as for the present formation of a pulse train in which the number of pulses represent the temperature differential to be ascertained. It is logical to use the same resolution in both instances, hence, the same clock.

The pulses permitted to pass gate 32 are added to the content of a counter 35 which thus tallies thermal units as we just defined. The pulse group or train added represents the measured temperature differential; that the state of counter 38 actually represents BTU units collected, will be described next.

It will be recalled that the through flow of the liquid through the collector is metered by a flow meter 14. The flow meter is constructed to issue pulses at a rate which represents a flow rate. Thus, the issuance of any pulse represents the fact that a particular unit quantity of liquid has flown through (e.g., out of the collector) since the last pulse was issued by the device 14. A counter 36 is used to divide the pulse rate and to count down the pulse rate as actually issued by the flow meter. The counter 36 thus produces a pulse each time a particular, larger quantity of liquid has passsed, for example, a gallon or a liter or a pound of water or whatever unit one chooses for the system. Device 36 is actually a part of the flow meter and matches the properties of a commercially available unit 14 to the need of the present system as far as pulse rate and spacing values in between the two sequentials from rate pulses is concerned.

The output signal of counter 36 (persisting longer than the rate of clock pulses from 26) is applied to a flip flop 37 which will set on the next clock. The flip flop 37 when set (Q output) provides an enabling signal to the counter 25 which, therefore, begins a ramp cycle! The highest stage of that counter serves as a clock input (falling clock) for another flip flop 38 which will reset at the end of the ramp sweep or cycle and apply an input to the reset input of flip flop 37. Flip flop 37 in turn will reset on the next clock 26, thereby disabling counter 25. The $\overline{Q}$ output of flip flop 37 forces asynchronously flip flop 38 back to the reset state to wait for the next flow meter pulse.

It can, thus, be seen that only one ramp sweep cycle is produced per counted down flow meter pulse, and at the end of that cycle the ramp generator will stop and will not resume operation; i.e., it will not produce another sweep until so commanded by the next flow metering pulse from 14–36 which will set flip flop 38 to enable the counter 25 anew for another sweep.

Summarizing the foregoing, each time a particular quantity of water has flown into the collector, a temperature scan cycle is being run through and a ramp sweep is generated. During this temperature scan cycle, a number of pulses is added to the content of counter 35 which number represents a temperature differential which the collector generated by heating the fluid entering the collector. This tallying process is repeated for each unit volume of liquid flow. Thus, the rate of updating counter 35 is directly proportional to the volume of water that is being so heated.

If we assume for the sake of convenient illustration that the flow meter operated, countdown device 36 produces one pulse per pound of water and, if we further assume that each individual clock pulse permitted to pass gate 32 represents 1° F., then each pulse as counted in counter 35 represents one BTU.

We assumed that the clock pulse frequency is 350 cps so that a ramp sweep requiring 255 clock pulse steps is run through in a little under ¾ of a second. Thus, the water flow rate should exceed only very little one pound per second. This is rather a low rate. On the other hand it will be appreciated that for a given system the pulses from the devices 36 must not occur at a rate generator, as that would disturb the proportionality between volume and temperature differential. One gallon per second is a more practical maximum flow rate to be expected. However, chosing such a different volume unit requires a modification of the BTU value of the clock pulse count in 35. A gallon has 8.34 pounds of water. Thus, each clock pulse added to counter 35 now represents 8.34 BTUs.

Counter 35 is not necessarily a tallying device but may be used as another countdown device, to issue for example, a pulse after 120 pulse counts, such a down counted pulse represents about one thousand BTUs (with an error of 0.08%). This down counted pulse can be feed to a counter 40 being, for example, a mechanical one, and a suitable pulse stretcher and driver may be interposed. Counter 40 tallies the consumption in units of a thousand BTUs.

It will be appreciated that the circuit 20-31-32 is designed so that indeed only added BTUs are counted requiring an output temperature in excess of input temperature. Whenever the temperatures are such that sensor 13 senses, in fact, colder fluid than sensor 12, nothing is being counted. Sensor 13 must sense a temperature which is at least 1° F. higher than the inlet temperature sensed by 12 to arrive at just one pulse to be added to counter 35 per unit through flow per 14-36. Of course, one may use a higher resolution but that is hardly necessary.

It can readily be seen that the inventive BTU meter can actually be used in devices and systems other than solar energy collectors. The cause for the temperature increase of the fluid passing through collector 1 does not have to be radiation absorbtion, but could be the result of convective heat exchange, or any other mode of heating the device 1. Moreover, the device can also be used to measure dissipation of thermal energy. If, for example, device 1 is a dissipator, the fluid may flow in the reverse direction, and one can now use the measuring device and circuit exactly as illustrated. Alternatively, the connections of the inputs in each of the differential amplifiers 22 and 23, when reversed, permit the fluid system as per FIGS. 1 and 2 to remain as illustrated and described as far as fluid flow is concerned. Still, alternatively, one could simply invert the stair case reference.

The invention is not limited to the embodiments described above, but all changes and modifications thereof not constituting departures from the spirit and scope of the invention are intended to be included.

We claim:

1. A BTU meter for measuring the amount of energy absorbed or dissipated by a device for any length of time, said device having a collector, the collector being flown through by fluid, said meter comprising:
   first temperature-sensing means disposed and connected to provide a first signal representing the temperature of the fluid flow into the device;
   second temperature-sensing means disposed and connected to provide a second signal representing the temperature of the fluid flow out of the device;
   flow-sensing means disposed to provide a pulse each time a particular quantity of fluid as flown through a flow path which includes the device;
   a ramp generator providing a sweep signal and being connected for being triggered by each of said pulses;
   first and second comparators, both being connected to the ramp generator to receive therefrom the sweep signal as a reference signal and said first and second comparators further connected respectively to said first and second temperature-sensing means;
   logic gate means connected for combining outputs of the first and second comparators as produced by them to generate an enabling signal for a period of time in which the sweep signal sweeps through levels representing temperatures between said temperatures, respectively represented by the first and second signals;
   clock-pulse-generating and providing means; and
   means connected to the clock pulse means and to the logic gate means, to count clock pulses during each enabling signal and to, cumulatively, tally the result of the counting.

2. A BTU meter for measuring the amount of energy absorbed or dissipated by a device for any length of time, said device having a collector being flown through by a fluid, said meter comprising:
   first temperature-sensing means disposed and connected to provide a first signal representing the temperature of the fluid flow into the device;
   flow-sensing means disposed to provide a pulse each time a particular quantity of fluid has flown through a flow path which includes the device;
   clock-pulse-generating and providing means;
   a ramp generator including a recycling counter connected to receive clock pulses from said clock pulse means, further including a digital-to-analog converter connected to the counter, for generating a sweep signal and being connected for being triggered for recycling by each of said pulses;
   comparing means connected to the ramp generator to receive therefrom the sweep signal as a reference signal and further connected to said first and second temperature sensing means to provide an enabling signal for a period of time in which the sweep signal sweeps through levels representing temperatures between said temperatures, respectively represented by the first and second signals; and
   means connected to the clock pulse means and to the comparing means, to count clock pulses during each enabling signal and to, cumulatively, tally the result of the counting.

3. A BTU meter as in claim 2 the comparing means including first and second comparators respectively connected to the first and second sensing means; and each being further connected to the ramp generator; the comparing means further including logic gate means connected for combining outputs of the first and second comparators as produced by them to generate said enabling signal.

4. A BTU meter as in claim 1 or 2, wherein the collector is a solar radiation collector.

5. A BTU meter as in claim 1 or 2, wherein the collector is a water tank, absorbing thermal energy.

* * * * *